Nov. 7, 1967  M. J. MADSEN  3,351,116

LOCK WASHER

Filed Dec. 20, 1965

INVENTOR.
MARVIN J. MADSEN
BY Merchant + Gould
ATTORNEYS

United States Patent Office 3,351,116
Patented Nov. 7, 1967

3,351,116
LOCK WASHER
Marvin J. Madsen, Rte. 1, Truman, Minn. 56088
Filed Dec. 20, 1965, Ser. No. 514,910
1 Claim. (Cl. 151—34)

My invention pertains to improvements in lock washers, or the like, and more particularly to washers which keep the bolt or nut from turning during tightening or loosening operations.

In most cases lock washers are constructed with protruding lugs or barbs of various kinds. In general the barbs are cut or stamped from the center or outer edges of the washer. Some of these barbs extend upwardly and engage the head or nut of the bolt to prevent relative rotation. Other barbs protrude below the under side of the lock washer and are forced into the material when one tightens the nut or bolt with a wrench or some other means used for tightening.

This method of forcing the barbs into the material is sometimes very inefficient for the barbs can bend and will not be forced into the material which in turn will not hold the bolt or nut from turning and will create a slippage or misalignment of the lock washer. Also the prior art lock washers are generally very frail and cannot operate as a washer and provide the locking function simultaneously.

The present invention is a lock washer constructed of two overlying members secured together and having a recess therein adapted to receive the head or nut of a bolt. An opening compatible with the shank of the bolt is provided in the washer approximately coaxial with the recess. It should be noted at this time that when a bolt is referred to it is to have a shank to which there is attached a head and a nut either of which can take any of the standard shapes, such as hexagonal, square, etc.

This invention has in view as an object to provide a lock washer that is easy to apply and functions as a washer and a lock washer simultaneously.

It is a further object of the present invention to provide a lock washer for use with the head or nut of a bolt which washer has an improved locking mechanism and, therefore, operates in a more positive manner.

The above and still further objects of my invention will become apparent from the following detailed specification, appended claim, and attached drawings.

Referring to the drawings wherein like characters indicate like parts throughout the figures.

Figure 1:
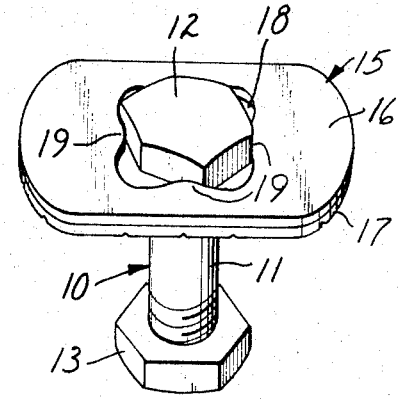
FIG. 1 is a perspective view illustrating the lock washer and bolt.
Figure 3:
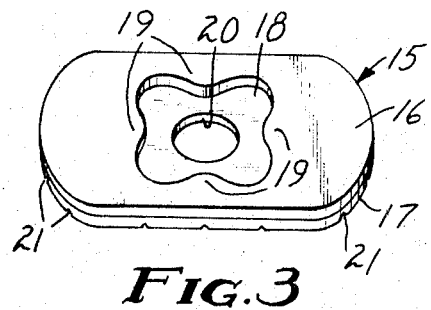
FIG. 3 is a perspective view illustrating the lock washer alone.
Figure 2:
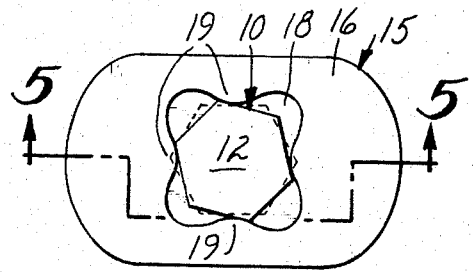
FIG. 2 is a top plan view of FIG. 1.

Referring to the drawings, I show a bolt 10 consisting of shank 11 and head 12 which is attached to the shank 11 at one end. To the shank 11 there is attached a nut 13 which is screw fitted to the opposite end of the shank 11 from head 12. It will be noted at this time that the drawings show a hexagonal head 12 and nut 13 but these can be any shape, such as square or the like, as long as there are flat surfaces or side walls that extend longitudinally on the head or nut of the bolt.

When securing two pieces of material together, with the bolt 10 the present washer which is generally designated 15 is positioned on shank 11 next to the head 12 for the purpose of holding the bolt from turning when the nut 13 is tightened or loosened. It should be noted that the present device could also be positioned next to the nut 13 to prevent the nut 13 from turning when tightening the bolt 10.

Washer 15 is comprised of two plates, upper plate 16 and a lower plate 17 both of which are illustrated with a substantially rectangular shape in this embodiment. Plates 16 and 17 are fixedly attached together in a substantially overlying relationship by some means such as spot welding or the like. As shown in the drawings (FIGS. 1-4), rectangular upper plate 16 has its outer ends rounded to eliminate sharp corners for safety and for ease of use. Approximately centrally within the rectangular plate 16 is provided a rectangular opening 18 for the purpose of receiving head 12 or nut 13 of bolt 10. Opening 18 has from the sides thereof protrusions 19 for the purpose of engaging the side walls of bolt head 12. As described above one will note that when the head 12 of bolt 10 is placed adjacent the rectangular opening 18 the head 12 is allowed to rotate slightly until the side walls of hexagonal head 12 are substantially parallel with portions of the protrusions 19. When this occurs the head 12 can be drawn into the opening 18 and is securely engaged by protrusions 19. The protrusions prevent relative axial rotation of the head 12 in either a clockwise or counterclockwise direction within opening 18 and allow the nut 13 to be tightened or loosened with a single tool.

Figure 4:
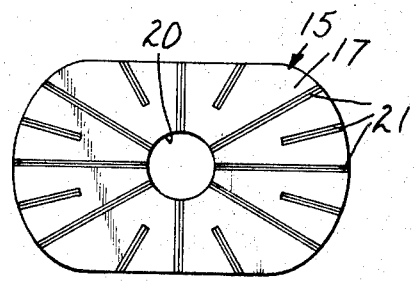
FIG. 4 is a bottom plan view of the lock washer.
Figure 5:
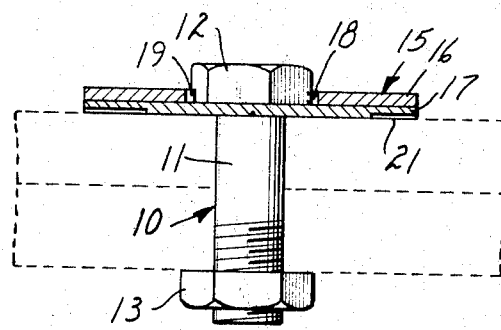
FIG. 5 is a sectional view taken along the line 5—5 of FIG. 2.

In this embodiment the lower plate 17 has the same shape as upper plate 16 so that when they are attached together they appear to be a single unit. Lower plate 17 has provided approximately centrally therein a round opening 20 for the purpose of receiving the shank 11 of bolt 10. Openings 18 and 20 are approximately coaxial in the assembled device which allows the bolt 10 to be centered in plates 16 and 17. The under side of lower plate 17, which comes in contact with one surface of the material to be bolted together, is scored at 21 as shown in FIG. 4. This scoring will prevent the washer 15 from turning by imbedding its edges into the surface of the material to be bolted.

In the operation of the washer 15 to be used, one places the shank 11 of bolt 10 through the opening 20 in the lower plate 17 and allows the head 12 to nest in the rectangular opening 18 or plate 16. The bolt 10 is then inserted into a drilled hole in the material to be bolted and nut 13 is applied to bolt 10. As nut 13 is tightened on shank 11 the head 12 is pulled downwardly to clamp the material. The side walls of head 12 are in abutting relationship with the protrusions 19 in opening 18 which prevents relative axial rotation between the washer 15 and the bolt 10. It should be noted that protrusions 19 prevent relative rotation during tightening or loosening of nut 13. The scoring 21, on the under side of plate 17, will prevent the washer 15 from rotating, thus keeping the washer 15 and bolt 10 from rotating in the drilled hole provided in the material. Therefore, the nut 13 can be tightened or loosened on shank 11 of bolt 10 quickly and easily with a single tool.

Figure 6:
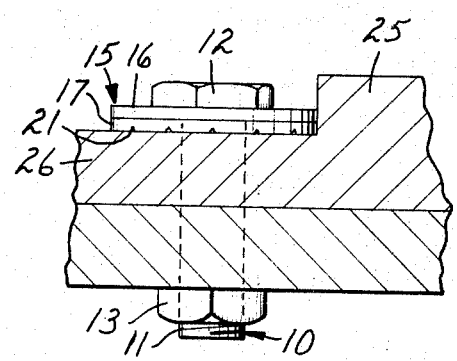
FIG. 6 is a sectional view similar to FIG. 5 showing a modified mounting of the lock washer.

Referring to FIG. 6 there is shown an alternate use of the washer 15 when bolting two pieces of material together. The upper material 25 is shown with a reduced portion or flange 26 that in many cases is required in castings etc., where an otherwise excessively long bolt would be required. In castings of this sort the washer 15 is placed with its flat side against or abutting the upwardly protruding portion of the flange 26. This abutting relationship with the stationary material 25 prevents the washer 15 from turning when the nut 13 is tightened on bolt 10.

Figure 7:
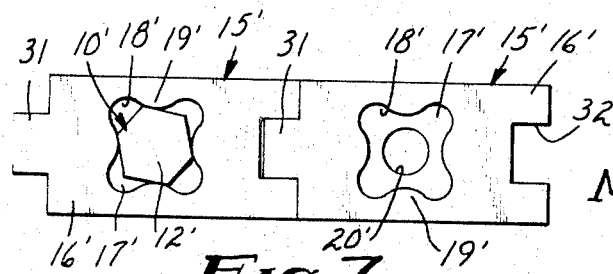
FIG. 7 is a top plan view of a modified form of lock washer.

In a modified form of lock washer 15, shown in FIG. 7, I provide a washer 15' of the same construction as shown in FIGS. 1-6 having upper and lower plates 16' and 17' with their respective openings 18' and 20', details of which are not shown. As seen in FIG. 7 the washer 15' is provided with a substantially rectangular shaped tongue 31 which is shown protruding from the left end of plates 16' and 17' and a mating groove 32 on the right edge thereof. Groove 32 receives a tongue 31 of a mating washer 15' which prevents the washers 15' from rotating. The washers 15' in turn prevent bolts 10', inserted therein, from rotating.

My invention has been thoroughly tested and found to be completely satisfactory for the accomplishment of the above objects. While I have shown and described a preferred embodiment, I wish it to be specifically understood that the same is capable of modification without departure from the spirit and scope of the appended claim.

What is claimed is:

Means for securing from axial rotation the enlarged end portion of a bolt or the like comprising upper and lower plate members rigidly secured together in a flat, overlying state, said upper plate member having an opening therethrough, said opening being shaped to receive therein polygonal shaped enlarged ends of bolts and substantially preventing rotational movement of a received bolt about the axis thereof, said lower plate member having an opening therein substantially axially aligned with said opening through said upper member and adapted to receive therethrough the shank of said bolt, the opening in said lower plate member having smaller radial dimensions than the opening in said upper plate member to provide an axial shoulder against which the enlarged end of the received bolt abuts, said secured together members having in addition a tongue portion of less width than said members protruding outwardly from one edge thereof in the plane of the secured together members and an opposed edge having a mating recess therein adapted to receive the tongue portion on a second securing means for locking a plurality of said means together in relative nonrotational positions.

References Cited
UNITED STATES PATENTS

| | | | |
|---|---|---|---|
| 502,363 | 8/1893 | Howell | 151—54 |
| 794,127 | 7/1905 | Slayton et al. | 151—44 |
| 1,215,971 | 2/1917 | Nolan | 151—34 |
| 1,261,616 | 4/1918 | Reinicker | 151—60 |
| 1,497,882 | 6/1924 | Rumely | 151—68 |

CARL W. TOMLIN, *Primary Examiner.*

R. S. BRITTS, *Assistant Examiner.*